United States Patent

[11] 3,587,631

| [72] | Inventor | Jesse Loader<br>Redditch, England |
|---|---|---|
| [21] | Appl. No. | 825,167 |
| [22] | Filed | May 16, 1969 |
| [45] | Patented | June 28, 1971 |
| [73] | Assignee | The Hymatic Engineering Company Limited<br>Redditch, England |
| [32] | Priority | May 22, 1968 |
| [33] | | Great Britain |
| [31] | | 24,432/68 |

[54] RELATING TO BUTTERFLY VALVES
4 Claims, 9 Drawing Figs.

[52] U.S. Cl............................................... 137/527
[51] Int. Cl............................................... F16k 15/03
[50] Field of Search................................. 137/527, 527.4, 527.6; 251/303, 305, 306, 307, 308

[56] References Cited
UNITED STATES PATENTS

| 1,168,579 | 1/1916 | Thorsby | 137/527.6 |
| 2,978,222 | 4/1961 | Henrion | 251/306X |
| 3,013,579 | 12/1961 | Gilliam | 137/527X |

Primary Examiner—Robert G. Nilson
Attorney—Watson, Cole, Grindle and Watson

ABSTRACT: A nonreturn butterfly valve includes a movable valve plate, cooperating with a flat annular seating afforded by a ring, to which the plate is connected by a link pivoted to the ring about a first axis, lying close to the plane of the seating and extending across the seating approximately centrally, and pivoted to the plate about a second axis which lies parallel to the first axis, and, in the close position, lies between the first axis and a first edge of the plate, and a torsion spring surrounding the second pivot so that the valve can open by the link pivoting in one direction while the plate first swings in the same direction about a second edge remote from the first edge, against the action of the spring, and thereafter swings in the opposite direction about the second axis, still against the action of the spring, causing the first edge to move towards or through the plane of the seating as the plate moves towards a position at right angles to the plane of the seating.

PATENTED JUN 28 1971

INVENTOR
JESSE LOADER

BY
Watson, Cole, Grindle & Watson
ATTORNEY

RELATING TO BUTTERFLY VALVES

This invention relates to butterfly valves and an object of the invention is to provide a compact form of valve, which none-the-less leaves a substantially clear passage for the flow of liquid when in the open position.

According to the present invention a butterfly valve includes a movable valve plate, cooperating with a seating lying generally in a plane and afforded by a ring to which the plate is connected by a link pivoted to the ring about a first axis, lying close to the plane of the seating and extending across the seating approximately centrally, and pivoted to the plate about a second axis which lies parallel to the first axis and, in the closed position, lies between the first axis and a first edge of the plate, so that the valve can open by the link pivoting in one direction while the plate first swings in the same direction about a second edge remote from the first edge, and thereafter swings in the opposite direction about the second axis, causing the first edge to move towards or through the plane of the seating as the plate moves towards a position at right angles to the plane of the seating. The face of the seating may be frustoconical, but preferably it is of plane annular form.

In one form of the invention the link and seating are on opposite sides of the plate, and in the initial opening movement the link moves away from the plane of the seating.

In another arrangement the link and seating are on the same side of the plate, and in the initial opening movement the link moves towards the plane of the seating.

In a preferred form of the invention the valve is a nonreturn valve, and includes a spring connected between the plate and the link, which effects the closing movement by pivoting the plate relatively to the link, thereby swinging the plate about the second axis in one direction until it second edge engages the ring then swinging it in the opposite direction about the said edge, accompanied by swinging of the link about the first axis.

The invention may be put into practice in various ways but two specific embodiments will be described by way of example with reference to the accompanying drawings, in which.

Figure 1:
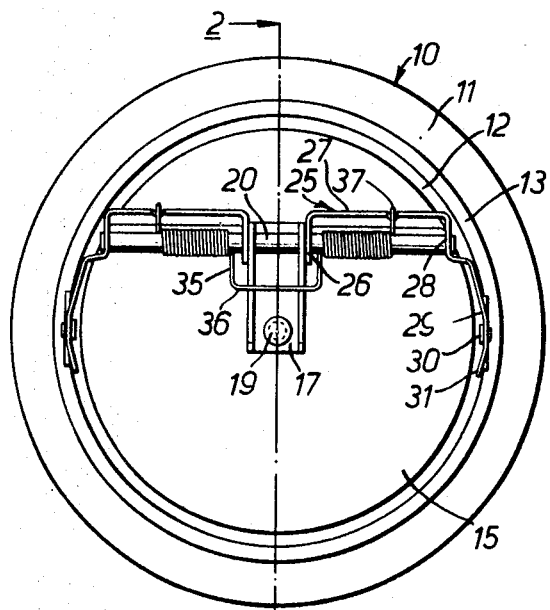
FIG. 1 is an elevation of one form of nonreturn valve, viewed from downstream.

In the embodiments shown the invention is applied to a light nonreturn valve, for example for fitting to a 3'' bore pipe. The valve comprises a ring 10 which affords a plane annular flange 11, which can be secured to a pipe flange, a seating 12 of plane annular form and a tubular flange 13. Cooperating with the seating 12 is a valve plate 15 in the form of a thin pressed steel disc with a circumferential strengthening lip 16, the edge of which rests flat against the seating throughout its periphery in the closed position. At its center the valve plate is riveted by a rivet 19 to one end of a channel-section bracket 17, having holes 18 through the flanges at its other end to receive a pivot pin 20. This pivot pin serves to pivot the plate to a link 25 formed in two portions, each comprising an inner end 26 which lies alongside the adjacent flange of the channel-section bracket 17, and has a hole through which the pivot pin 20 extends, a longitudinal portion 27 extending parallel to the pivot, an outer end 28 extending parallel to the inner end, and having a further hole through which the end of the pivot pin extends and an extended end portion 29. The extended end portions are pivoted by rivets 30 to the tubular flange 13, at diametrically opposite points. The pivot 30 formed by these two rivets lies parallel to the pivot pin 20 connecting the plate to the link. The extensions 29 terminate in noses 31 which extend beyond the rivets to form stops limiting the movement of the link.

A double helical torsion spring 35 surrounds the pivot pin 20, and has a central portion 36 passing over and bearing upon the channel section bracket 17, and two end portions 37 bearing upon the longitudinal portions 27 of the two halves of the link.

Figure 2:
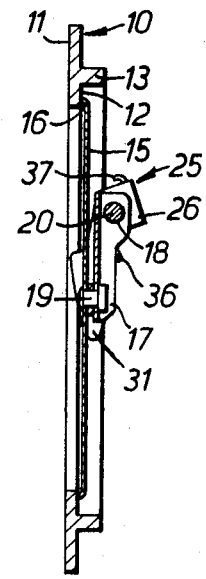
FIGS. 2 to 5 are sections generally on the line 2–2 of FIG. 1 respectively showing the valve in four different positions from the closed position of FIGS. 1 and 2 to the fully open position of FIG. 5, and FIGS. 6 to 9 are views similar to FIGS. 2 to 5 of a modified construction.
Figure 3:
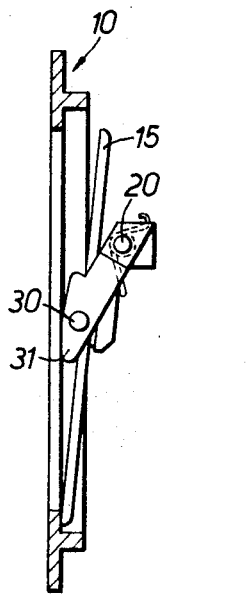

Thus assuming, for convenience, that the valve lies as shown in the drawings, in a vertical plane with the pivot 20 of the plate extending horizontally above the axis, and is viewed from the side so that it opens to the right, the operation is as follows. Starting with the valve in the closed position of FIGS. 1 and 2 with the plate 15 resting against the seating, the pressure of fluid will tend to move the valve plate to the right. The spring 35 meanwhile tends to move it in a clockwise direction so that its lower edge remains in contact with the seating and rocks in a clockwise direction about that edge, while the link simultaneously turns clockwise about its pivot 30 as shown in FIG. 3.

Figure 4:
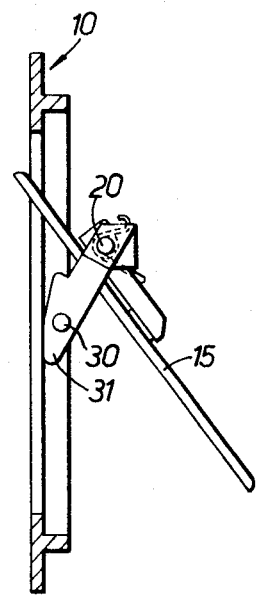
Figure 5:
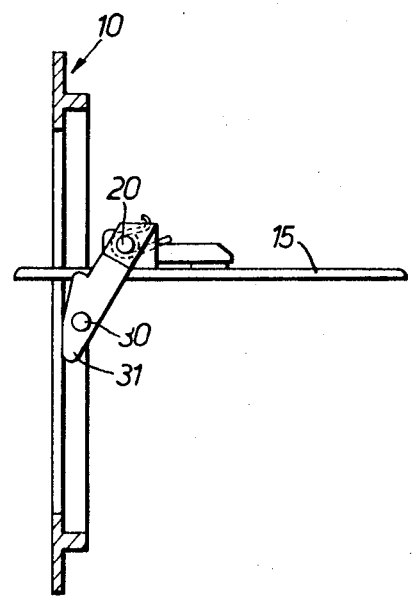
Figure 6:
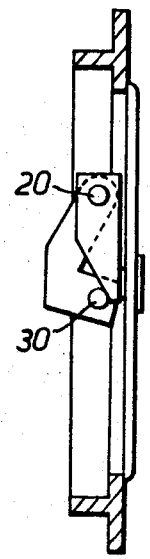
Figure 7:
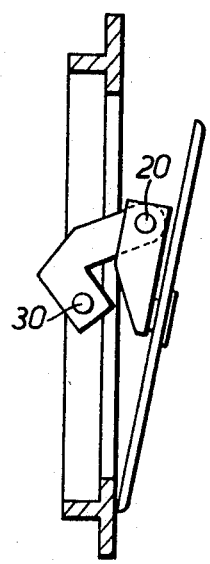
Figure 8:
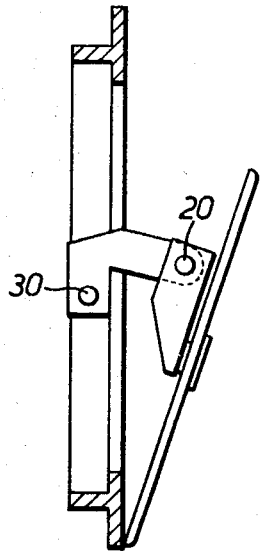
Figure 9:
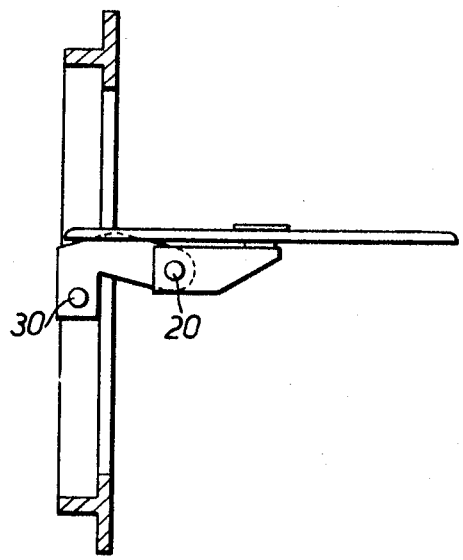

When the link has moved through a certain angle, for example of the order of 30°, the noses 31 on its extended ends engage the surface of the ring alongside the seating and prevent further movement about its axis 30. The pivot 20 of the plate is substantially above its centerline, so that the pressure of fluid will tend to tilt it in counter clockwise direction and this will overcome the action of the spring and further opening of the valve will be by counter clockwise pivoting of the plate about its pivot pin 20 as shown in FIG. 4. Such movement can continue until the plate is substantially parallel to the axis of the valve as shown in FIG. 5. The closing movement is a simple reversal of the opening movement under the action of the spring.

It will be appreciated that the valve described is extremely light and compact, and in the closed position hardly projects at all beyond the ring incorporating the seating which can be bolted between a pair of pipe flanges. In the open position the valve plate, which is quite thin, lies substantially in the direction flow, and almost the whole area of the opening of the seating is left clear for the flow of fluid so that it provides a high flow area in proportion to the pipe cross section. Although in the closed position the valve plate fits flat against the seating, it moves away from it in the fully open position without at any time fouling the pipes to which the valve is connected.

In the embodiment of FIGS. 1 to 5 the link and seating are on opposite sides of the plate, the plate being (as it must be for nonreturn action) on the downstream side of the seating, and the link being on the downstream side of the plate. In an alternative embodiment shown diagrammatically in FIGS. 6 to 9 the link and seating are both on the upstream side of the plate. The main parts bear the same reference numerals as in FIGS. 1 to 5 although the spring analogous to the spring 36 is omitted from FIGS. 6 to 9 for the sake of simplicity. As the operation is precisely analogous to that of the first embodiment it is believed that further description is unnecessary.

In either embodiment the link may be of such length that the upper edge of the plate passes through the plane of the seating (as in FIGS. 4, 5 and 9) to the fully open position, or of such length that it does not.

I claim:

1. A nonreturn butterfly valve including a movable valve plate, cooperating with a seating lying generally in a plane and afforded by a ring to which the plate is connected by a link pivoted to the ring about a first axis, lying close to the plane of the seating and extending across the seating approximately centrally, and pivoted to the plate about a second axis which lies parallel to the first axis and, in the closed position, lies between the first axis and a first edge of the plate, a spring so connected between the plate and the link as to bias the center of the plate towards the first axis, so that the valve can open against the spring bias by the link pivoting in one direction while the plate first swings in the same direction about a second edge remote from the first edge, and thereafter swings in the opposite direction about the second axis, causing the first edge to move towards or through the plane of the seating as the plate moves towards a position at right angles to the plane of the seating, and the spring effects the closing movement by pivoting the plate relatively to the link, thereby swinging the plate about the second axis in one direction until its second edge engages the ring then swinging it in the opposite direction about the said edge, accompanied by swinging of the link about the first axis.

2. A valve as claimed in claim 1 in which the seating is of plane annular form.

3. A valve as claimed in claim 1 in which the link and seating are on opposite sides of the plate, and in the initial opening movement the link moves away from the plane of the seating.

4. A valve as claimed in claim 1 in which the link and seating are on the same side of the plate, and in the initial opening movement the link moves towards the plane of the seating.